(12) United States Patent
Steinmetz

(10) Patent No.: US 11,131,751 B2
(45) Date of Patent: Sep. 28, 2021

(54) METHODS AND SYSTEMS FOR CALIBRATING AND/OR TESTING RADARS OR ANTENNAS

(71) Applicant: Elta Systems Ltd., Ashdod (IL)

(72) Inventor: Josef Steinmetz, Givat Shmuel (IL)

(73) Assignee: ELTA SYSTEMS LTD., Ashdod (IL)

( * ) Notice: Subject to any disclaimer, the term of this patent is extended or adjusted under 35 U.S.C. 154(b) by 335 days.

(21) Appl. No.: 16/233,977

(22) Filed: Dec. 27, 2018

(65) Prior Publication Data
US 2019/0204414 A1    Jul. 4, 2019

(30) Foreign Application Priority Data

Dec. 31, 2017   (IL) .......................................... 256678

(51) Int. Cl.
*G01S 7/40*    (2006.01)
*G01S 13/75*   (2006.01)

(52) U.S. Cl.
CPC .............. *G01S 7/4052* (2013.01); *G01S 7/40* (2013.01); *G01S 7/406* (2021.05); *G01S 7/4086* (2021.05); *G01S 13/755* (2013.01); *G01S 7/4082* (2021.05)

(58) Field of Classification Search
CPC .. G01S 7/4052; G01S 7/40; G01S 2007/4086; G01S 2007/406
See application file for complete search history.

(56) References Cited

U.S. PATENT DOCUMENTS 5,164,734 A    11/1992   Fredericks et al.
8,487,809 B2   7/2013    Lefauvre et al.
(Continued)

FOREIGN PATENT DOCUMENTS

CN    103901413 A      7/2014
CN    103969631 A  *   8/2014
(Continued)

OTHER PUBLICATIONS

Boyer, et al., UAV-Based Calibration for Polarimetric Phased Array Radar, In (poster) 16th Annual AMS Student Conference, Jan. 2017, pp. 1-7.
(Continued)

*Primary Examiner* — Thomas M Hammond, III
(74) *Attorney, Agent, or Firm* — Browdy and Neimark, PLLC

(57) ABSTRACT

A device for calibrating a radar or an antenna and embedded on an aerial vehicle, comprising:
a processing unit configured to apply a delay to an incoming electromagnetic signal, wherein the device is configured to provide said electromagnetic signal with said delay to an emitter for its back transmission,
wherein the processing unit is configured to control said delay according to one or more delay values, wherein each delay value simulates a virtual range of the device or of the aerial vehicle with respect to said radar or antenna receiving said transmitted electromagnetic signal, said virtual range being different from an actual range of the device or of the aerial vehicle, for calibrating said at least one radar or antenna based on said transmitted electromagnetic signal which simulates a virtual range of the device or of the aerial vehicle with respect to said at least one radar or antenna.

18 Claims, 11 Drawing Sheets

(56) References Cited

U.S. PATENT DOCUMENTS

| | | | | |
|---|---|---|---|---|
| 8,908,753 B2 * | 12/2014 | Li | | H04B 17/21 375/224 |
| 2006/0238413 A1 * | 10/2006 | Yehudaie | | G01S 5/021 342/174 |
| 2009/0058715 A1 * | 3/2009 | Sarafian | | G01S 7/4052 342/169 |
| 2015/0035697 A1 * | 2/2015 | Cho | | G01S 7/4026 342/172 |
| 2016/0245900 A1 * | 8/2016 | Hurtarte | | G01S 7/4052 |
| 2019/0037520 A1 * | 1/2019 | O'Shea | | G01S 5/0252 |
| 2019/0310341 A1 * | 10/2019 | Wang | | G01S 3/74 |
| 2020/0371206 A1 * | 11/2020 | Glass | | G01S 7/4052 |
| 2021/0018591 A1 * | 1/2021 | Gruber | | G01S 7/4052 |

FOREIGN PATENT DOCUMENTS

| | | | |
|---|---|---|---|
| CN | 104459645 A | 3/2015 | |
| CN | 106526551 A | 3/2017 | |
| EP | 3296760 A1 * | 3/2018 | ............... G01S 7/40 |
| GB | 2318011 A | 8/1998 | |
| WO | 00/22454 A1 | 4/2000 | |
| WO | WO-0022454 A1 * | 4/2000 | ........... G01S 7/4052 |
| WO | 2007/113790 A1 | 10/2007 | |

OTHER PUBLICATIONS

Pienaar, et al., Dynamic Radar Calibration using an Airborne Active Calibration Target, In 2015 1st URSI Atlantic Radio Science Conference (URSI AT-RASC), 2015, p. 1.

Suh, et al., Drone-Based External Calibration of a Fully Synchronized Ku-Band Heterodyne FMCW Radar, IEEE Transactions on Instrumentation and Measurement, Aug. 2017, pp. 2189-2197, vol. 66, No. 8.

Using drones for weather radar calibration, d1rkab7tlqy5f1.cloudfront.net/TUDelft/Onderwijs/Opleidingen/Master/ MSc_Applied_Earth_Sciences/Msc_Topics_GRS/CU_atmos_UAVcalibration.pdf, Nov. 2017, p. 1.

* cited by examiner

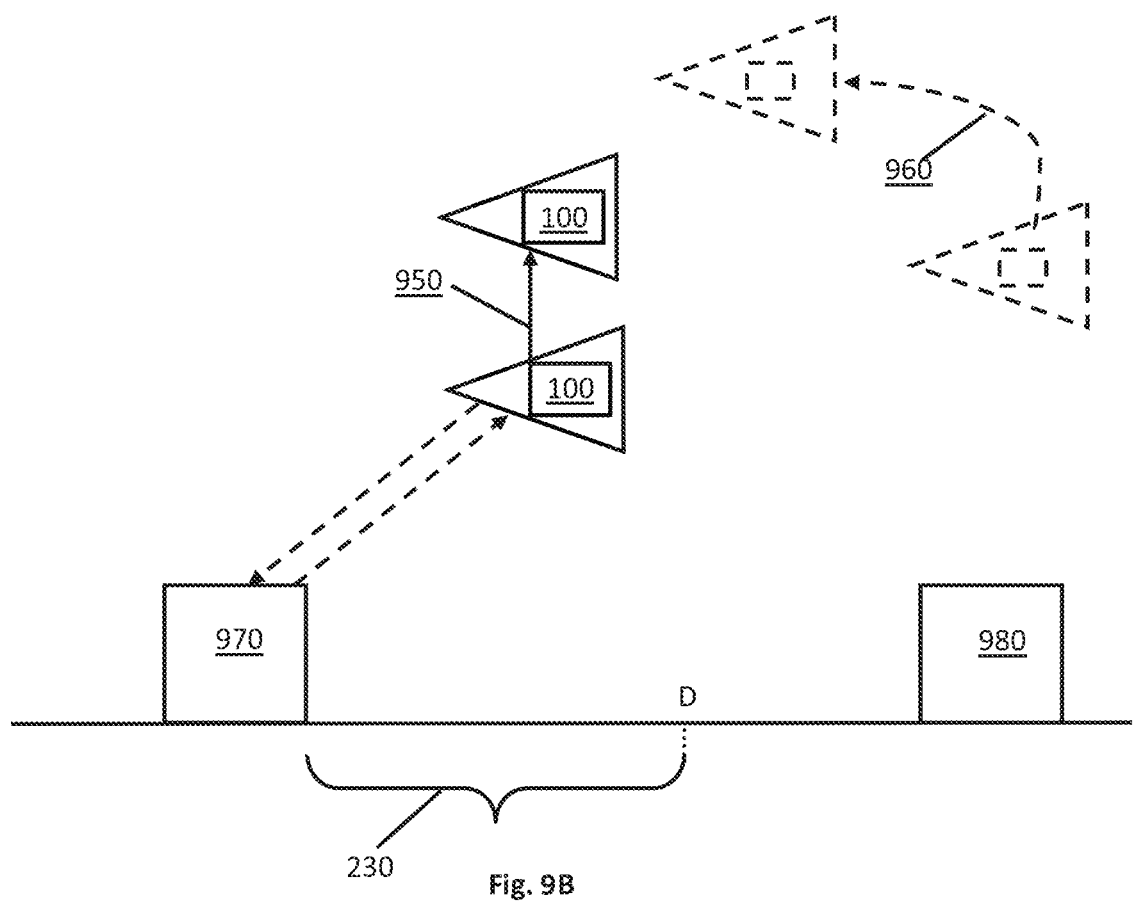

METHODS AND SYSTEMS FOR CALIBRATING AND/OR TESTING RADARS OR ANTENNAS

TECHNICAL FIELD AND BACKGROUND

The presently disclosed subject matter relates to calibrating and/or testing radars.

There is a need to propose new methods and systems for calibrating and/or testing radars.

GENERAL DESCRIPTION

In accordance with certain aspects of the presently disclosed subject matter, there is provided a device for calibrating a radar or an antenna, said device being configured to be embedded on an aerial vehicle, the device being configured to receive at least one electromagnetic signal, the device comprising a processing unit configured to apply a delay to said electromagnetic signal, wherein the device is configured to provide said electromagnetic signal with said delay to an emitter for its back transmission, wherein the processing unit is configured to control said delay according to one or more delay values, wherein each delay value simulates a virtual range of the device or of the aerial vehicle with respect to at least one radar receiving said transmitted electromagnetic signal, said virtual range being different from an actual range of the device or of the aerial vehicle with respect to said at least one radar or antenna, for calibrating said at least one radar or antenna based on said transmitted electromagnetic signal which simulates a virtual range of the device or of the aerial vehicle with respect to said at least one radar or antenna.

In addition to the above features, the device according to this aspect of the presently disclosed subject matter can optionally comprise one or more of features (i) to (xii) below, in any technically possible combination or permutation:

i. the processing unit is configured to control said delay so as to make it vary over time according to one or more delay values, wherein each delay value simulates a virtual range of the device or of the aerial vehicle with respect to at least one radar receiving said transmitted electromagnetic signal, said virtual range being different from an actual range of the device or of the aerial vehicle with respect to said at least one radar or antenna, for calibrating said at least one radar or antenna based on said transmitted electromagnetic signal which simulates a virtual range of the device or of the aerial vehicle with respect to said at least one radar or antenna;

ii. the processing unit is configured to apply a given delay when at least one of the device and the aerial vehicle is in a proximity zone of the radar or antenna or enters a proximity zone of the radar or antenna, wherein said given delay simulates a virtual range of the device or of the aerial vehicle which is out of said proximity zone;

iii. said proximity zone is a blind zone of the radar or antenna;

iv. the device is configured to communicate with a non-transitory memory storing data representative of delay values, wherein data representative of each delay value is associated with data representative of the flight path of the aerial vehicle, wherein the processing unit is configured to delay the electromagnetic signals based at least on said data representative of delay values and said data representative of the flight path of the aerial vehicle;

v. the processing unit is further configured to modulate the electromagnetic signal before its back transmission, thereby simulating a virtual radial velocity of the device or of the aerial vehicle which is different from an actual radial velocity of the device or of the aerial vehicle;

vi. the processing unit is configured to modulate said electromagnetic signal when the device or the aerial vehicle has an actual radial velocity which is below a predefined threshold, for simulating a higher virtual radial velocity than the actual radial velocity;

vii. the processing unit is configured to increase the delay when the aerial vehicle moves from a first position to a second position, said second position having a lower range with respect to said at least one radar or antenna than the first position, wherein a second elevation angle of the aerial vehicle at the second position is higher than a first elevation angle of the aerial vehicle at the first position, for calibrating the radar or antenna at said second elevation angle;

viii. the processing unit is configured to modulate said electromagnetic signal when the aerial vehicle has a flight path with a substantially constant elevation angle with respect said at least one radar or antenna, and a varying azimuth angle, for calibrating the radar or antenna along an azimuth direction;

According to another aspect of the presently disclosed subject matter there is provided a device for testing at least one of the detection and tracking performance of a radar or antenna, said device being configured to be embedded on an aerial vehicle, said device comprising a processing unit configured to apply a delay to said electromagnetic signal, wherein the device is configured to provide said electromagnetic signal with said delay to an emitter for its back transmission, wherein the processing unit is configured to simulate a virtual trajectory of the device or of the aerial vehicle with respect to said at least one radar or antenna, said simulation comprising performing at least one of: controlling the delay according to one or more delay values, wherein each delay value simulates a virtual range of the device or of the aerial vehicle with respect to said at least one radar or antenna, said virtual range being different from an actual range of the device or of the aerial vehicle with respect to said at least one radar or antenna, and applying a modulation to the electromagnetic signals, in order to simulate a virtual radial velocity of the device or of the aerial vehicle, said virtual radial velocity being different from an actual radial velocity of the device or of the aerial vehicle, for testing at least one of the radar or antenna detection performances and tracking performances of a target moving along said virtual trajectory.

In addition to the above features, the device according to this aspect of the presently disclosed subject matter can optionally comprise one or more of features (i) to (viii) above.

According to another aspect of the presently disclosed subject matter, there is provided a system for calibrating a radar or an antenna, comprising a device (as described above, and which can comprise one or more of features (i) to (viii)), said device being embedded on an unmanned aerial vehicle, and an additional processing unit configured to compare data representative of the position of the aerial vehicle calculated by said at least one radar or antenna with data representative of the position of the aerial vehicle, for calibrating said at least one radar or antenna.

According to some embodiments, data representative of the position of the aerial vehicle are calculated by one or more additional pre-calibrated radars.

According to another aspect of the presently disclosed subject matter, there is provided a system for synchronizing a plurality of radars or antennas, wherein said plurality of radars comprises at least one active radar or antenna and at least one receiving radar or antenna, wherein said system comprises a device (as described above, and which can comprise one or more of features (i) to (viii)), said device being embedded on an unmanned aerial vehicle, and a processing unit configured to synchronize a clock of the active radar or antenna with a clock of the receiving radar or antenna, based on electromagnetic signals sent by the active radar or antenna, sensed by the device and transmitted back towards the receiving radar or antenna, and based on data representative of the position of the device or of the unmanned aerial vehicle.

According to another aspect of the presently disclosed subject matter, there is provided a system for calibrating a radar or an antenna, comprising a device (as described above, and which can comprise one or more of features (i) to (viii)), said device being embedded on an unmanned aerial vehicle, and an additional processing unit configured to determine, based on the electromagnetic signal transmitted by the device, at least one of data representative of the beam emitted by the radar or antenna, and data representative of coefficients of radiating elements of the antenna, said coefficients being representative of the phase or amplitude modification applied by said radiating elements to signals of the radar or antenna, before their transmission.

According to another aspect of the presently disclosed subject matter, there is provided a device for testing an aircraft identification antenna, said device being configured to be embedded on an aerial vehicle, wherein the device is configured to obtain electromagnetic signals representative of an aircraft identification code, said device comprising a processing unit configured to apply a delay to said electromagnetic signal, wherein the device is configured to provide said electromagnetic signal with said delay to an emitter for its back transmission, wherein the processing unit is configured to simulate a virtual trajectory of the device or of the aerial vehicle with respect to said aircraft identification antenna, said simulation comprising performing at least one of controlling the delay according to one or more delay values, wherein each delay value simulates a virtual range of the device or of the aerial vehicle with respect to said aircraft identification antenna, said virtual range being different from an actual range of the device or of the aerial vehicle with respect to aircraft identification antenna, and applying a modulation to the electromagnetic signals, in order to simulate a virtual radial velocity of the device or of the aerial vehicle, said virtual radial velocity being different from an actual radial velocity of the device or of the aerial vehicle, for testing said aircraft identification antenna in recognizing said aircraft identification code.

In addition to the above features, the device according to this aspect of the presently disclosed subject matter can optionally comprise one or more of features (i) to (viii) above.

According to some embodiments, the device described in the various embodiments above can be embedded on an unmanned aerial vehicle.

According to some embodiments, there is provided an unmanned aerial vehicle comprising the device described above.

In accordance with certain aspects of the presently disclosed subject matter, there is provided a method of calibrating a radar or an antenna, the method comprising receiving electromagnetic signals with a device mounted on an aerial vehicle, delaying the electromagnetic signals by said device, and transmitting back the delayed electromagnetic signals, wherein said delaying comprises controlling the delay according to one or more delay values, wherein each delay value simulates a virtual range of the device or of the aerial vehicle with respect to at least one radar receiving said transmitted electromagnetic signal, said virtual range being different from an actual range of the device or of the aerial vehicle with respect to said at least one radar or antenna, for calibrating said at least one radar or antenna based on said transmitted electromagnetic signal which simulates a virtual range of the device or of the aerial vehicle with respect to said at least one radar or antenna.

In addition to the above features, the method according to this aspect of the presently disclosed subject matter can optionally comprise one or more of features (ix) to (xxii) below, in any technically possible combination or permutation:

ix. the method comprises controlling said delay so as to make it vary over time according to one or more delay values, wherein each delay value simulates a virtual range of the device or of the aerial vehicle with respect to at least one radar receiving said transmitted electromagnetic signal, said virtual range being different from an actual range of the device or of the aerial vehicle with respect to said at least one radar or antenna, for calibrating said at least one radar or antenna based on said transmitted electromagnetic signal which simulates a virtual range of the device or of the aerial vehicle with respect to said at least one radar or antenna;

x. the method comprises comprising applying a given delay when at least one of the device and the aerial vehicle is in a proximity zone of the radar or antenna or enters a proximity zone of the radar or antenna, wherein said given delay simulates a virtual range of the device or of the aerial vehicle which is out of said proximity zone;

xi. said proximity zone is a blind zone of the radar or antenna;

xii. the method comprises obtaining data representative of delay values, wherein data representative of each delay value is associated with data representative of the flight path of the aerial vehicle, wherein the method comprises delaying the electromagnetic signals based at least on said data representative of delay values and said data representative of the flight path of the aerial vehicle;

xiii. the method comprises simulating a virtual radial velocity of the device or of the aerial vehicle which is different from an actual radial velocity of the device or of the aerial vehicle, said simulation comprising modulating said electromagnetic signal before its back transmission;

xiv. the method comprises modulating said electromagnetic signal when the device or the aerial vehicle has an actual radial velocity which is below a predefined threshold, for simulating a higher virtual radial velocity than the actual radial velocity;

xv. the method comprises modulating said electromagnetic signal when the aerial vehicle has a flight path with a substantially constant elevation angle with respect said at least one radar, and a varying azimuth angle, for calibrating the radar along an azimuth direction;

xvi. the method comprises increasing the delay when the aerial vehicle moves from a first position to a second position, said second position having a lower range with respect to said at least one radar than the first position, wherein a second elevation angle of the aerial vehicle at the second position is higher than a first elevation angle of the aerial vehicle at the first position, for calibrating the radar or antenna at said second elevation angle;

xvii. the method comprises calibrating an inertial navigation system of said at least one radar or antenna;

xviii. the method comprises calibrating said at least one radar, said calibration comprising comparing data representative of the position of the aerial vehicle calculated by said at least one radar with data representative of the position of the aerial vehicle, for calibrating said at least one radar;

xix. the data representative of the position of the aerial vehicle are calculated by one or more additional pre-calibrated radars;

xx. the method comprises determining, based on the electromagnetic signal transmitted by the device, at least one of data representative of the beam emitted by the radar or antenna, and data representative of coefficients of radiating elements of the antenna, said coefficients being representative of the phase or amplitude modification applied by said radiating elements to signals of the radar or antenna, before their transmission;

xxi. the method comprises synchronizing a clock of an active radar or antenna with a clock of a receiving radar or antenna, said synchronization being based on electromagnetic signals sent by the active radar or antenna, sensed by the device and transmitted back towards the receiving radar or antenna, and based on data representative of the position of the device or of the aerial vehicle;

xxii. said aerial vehicle is an unmanned aerial vehicle.

In accordance with certain aspects of the presently disclosed subject matter, there is provided a method of testing at least one of the detection and tracking performance of a radar or antenna, the method using a device embedded on an aerial vehicle, said device comprising a processing unit configured to apply a delay to said electromagnetic signal, wherein the device is configured to provide said electromagnetic signal with said delay to an emitter for its back transmission, the method comprising, by the processing unit, simulating a virtual trajectory of the device or of the aerial vehicle with respect to said at least one radar, said simulation comprising performing at least one of controlling the delay according to one or more delay values, wherein each delay value simulates a virtual range of the device or of the aerial vehicle with respect to said at least one radar or antenna, said virtual range being different from an actual range of the device or of the aerial vehicle with respect to said at least one radar or antenna, and applying a modulation to the electromagnetic signals, in order to simulate a virtual radial velocity of the device or of the aerial vehicle, said virtual radial velocity being different from an actual radial velocity of the device or of the aerial vehicle, for testing at least one of the radar or antenna detection performances and tracking performances of a target moving along said virtual trajectory.

In addition to the above features, the method according to this aspect of the presently disclosed subject matter can optionally comprise one or more of features (ix) to (xxii) above, in any technically possible combination or permutation.

In accordance with certain aspects of the presently disclosed subject matter, there is provided a method of testing an aircraft identification antenna, the method using a device embedded on an aerial vehicle, said device comprising a processing unit configured to apply a delay to said electromagnetic signal, wherein the device is configured to provide said electromagnetic signal with said delay to an emitter for its back transmission, wherein the processing unit is configured to simulate a virtual trajectory of the device or of the aerial vehicle with respect to said aircraft identification antenna, said simulation comprising performing at least one of controlling the delay according to one or more delay values, wherein each delay value simulates a virtual range of the device or of the aerial vehicle with respect to said aircraft identification antenna, said virtual range being different from an actual range of the device or of the aerial vehicle with respect to aircraft identification antenna, and applying a modulation to the electromagnetic signals, in order to simulate a virtual radial velocity of the device or of the aerial vehicle, said virtual radial velocity being different from an actual radial velocity of the device or of the aerial vehicle, for testing said aircraft identification antenna in recognizing said aircraft identification code.

According to some embodiments, the method comprises testing said at least one aircraft identification antenna in recognizing an aircraft identification code of a given aircraft, said testing comprising transmitting the aircraft identification code of said given aircraft to the device, and simulating a virtual trajectory of said given aircraft.

In addition to the above features, the method according to this aspect of the presently disclosed subject matter can optionally comprise one or more of features (ix) to (xxii) above, in any technically possible combination or permutation. In accordance with certain aspects of the presently disclosed subject matter, there is provided a non-transitory storage device readable by a machine, tangibly embodying a program of instructions executable by the machine to perform a method according to one or more of the embodiments described above.

According to some embodiments, the proposed solution allows testing and/or calibrating radars (or more generally antennas) in a flexible, simple and efficient way.

According to some embodiments, the proposed solution allows testing and/or calibrating radars at short range and at high elevation angles. In particular, the proposed solution can replace near-field calibration, which is usually performed in an antenna room.

According to some embodiments, the proposed solution allows testing and/or calibrating radars in a more accurate way.

According to some embodiments of the proposed solution, interferences due to refraction of electromagnetic waves are reduced, thereby increasing accuracy.

According to some embodiments, undesired fluctuations of energy sent by the radar to be tested or to be calibrated, are reduced.

According to some embodiments, uncertainties on the position of a device mounted on an aerial vehicle used to test and/or calibrate radars, are reduced. This is particularly true when the device is mounted on an aerial vehicle which can be modelled as a point target, such as an unmanned aerial vehicle.

According to some embodiments, the proposed solution allows testing and/or calibrating radars with reduced time.

According to some embodiments, the proposed solution allows testing and/or calibrating radars in a way which decouples totally, or at least partially, the azimuth angle and the elevation angle.

According to some embodiments, the proposed solution allows testing and/or calibrating radars more frequently.

According to some embodiments, the proposed solution allows testing and/or calibrating radars at lower cost.

According to some embodiments, the proposed solution allows testing and/or calibrating radars at high range and/or at a high altitude and/or at a high elevation angle with an aerial vehicle flying at a low altitude and/or at a low range and/or at a low elevation angle.

According to some embodiments, the proposed solution allows testing and/or calibrating radars without relying on localization systems embedded on an aerial vehicle.

According to some embodiments, the proposed solution allows testing and/or calibrating radars using a device embedded on an aerial vehicle, wherein the device can be modelled as a point target, thereby reducing undesired reflections.

According to some embodiments, the proposed solution allows testing and/or calibrating an inertial navigation system (INS) of the radar in a more efficient way, and more frequently. The same advantages that were described above in the test and/or calibration of radars apply here to the test and/or calibration of the INS of the radar.

According to some embodiments, the proposed solution allows testing and/or calibrating an identification system or antenna (such as "Identification, friend or foe"—IFF system) in a more efficient way, and at lower cost.

In particular, according to some embodiments, the proposed solution allows testing the identification antenna (such as an IFF antenna) in the identification of a given aircraft, by using another simple aerial vehicle (such as an unmanned aerial vehicle), thereby avoiding the need to make the given aircraft fly.

The same advantages that were described above in the test and/or calibration of radars, apply here to the test and/or calibration of the IFF system.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 9B illustrates an example of the method of FIG. 9A.

DETAILED DESCRIPTION

In the following detailed description, numerous specific details are set forth in order to provide a thorough understanding of the invention. However, it will be understood by those skilled in the art that the presently disclosed subject matter can be practiced without these specific details. In other instances, well-known methods have not been described in detail so as not to obscure the presently disclosed subject matter.

Unless specifically stated otherwise, as apparent from the following discussions, it is appreciated that throughout the specification, discussions utilizing terms such as "receiving", "delaying", "controlling", "applying", "increasing", "modulating", or the like, refer to the action(s) and/or process(es) of a processing unit that manipulate and/or transform data into other data, said data represented as physical data, such as electronic, quantities and/or said data representing the physical objects.

The term "processing unit" covers any computing unit or electronic unit with data processing circuitry that may perform tasks based on instructions stored in a memory, such as a computer, a server, a chip, a processor, etc. It encompasses a single processor or multiple processors, which may be located in the same geographical zone or may, at least partially, be located in different zones and may be able to communicate together.

Various embodiments of testing and/or calibrating methods are described, which can apply to, depending on the embodiments, e.g. active radars, passive radars, active antennas, passive antennas, etc.

Embodiments of the presently disclosed subject matter are not described with reference to any particular programming language. It will be appreciated that a variety of programming languages can be used to implement the teachings of the presently disclosed subject matter as described herein.

Figure 1:
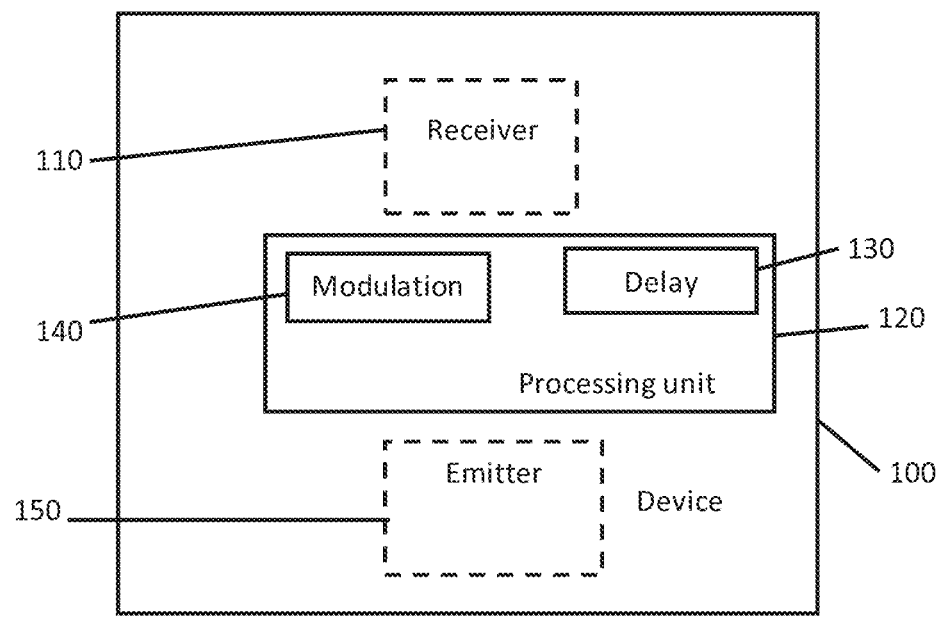
FIG. 1 illustrates an embodiment of a device, configured to be embedded on an aerial vehicle.

FIG. 1 is a schematic representation of an embodiment of a device 100. As explained later in the specification, device 100 can be used to test and/or to calibrate one or more radars. Other applications will be described hereinafter.

Device 100 is configured to be embedded on an aerial vehicle. According to some embodiments, the aerial vehicle can include an unmanned aerial vehicle (which can be controlled e.g. by an auto-pilot embedded in the UAV, and/or by a human pilot located on the ground), a drone, an aerial vehicle flying at low altitude (either due to its configuration, which allows only low altitude flights, or, due to regulations, constraining the aerial vehicle to fly at low altitude only), etc. According to some embodiments, the aerial vehicle cannot fly above 5 km. This is however not limitative.

According to some embodiments, device 100 can comprise a receiver 110. The receiver 110 can comprise e.g. one or more antennas. The receiver 110 can in particular receive one or more electromagnetic signals emitted by one or more radars. As explained later in the specification, according to some embodiments, the receiver is not part of the device 100 and the device 100 receives the electromagnetic signals from an external receiver, such as a receiver of the aerial vehicle.

The device 100 can further comprise at least one processing unit 120. The processing unit 120 can perform various processing tasks of the methods described hereinafter in the specification. The processing unit 120 can be in communication with one or more of the modules of the device 100.

According to some embodiments, the device 100 can be configured to apply a delay to the received electromagnetic signals.

According to some embodiments, the processing unit 120 can be configured to apply a delay (see reference 130), or a plurality of delays, to the received electromagnetic signals. In this case, the delay is implemented digitally. This can be performed by introducing some delay in the digital representation of the electromagnetic signals, which can be obtained e.g. using analog to digital converters. In some embodiments, the delay can be introduced by writing the received electromagnetic signals in a memory during a first period of time T1, and reading these electromagnetic signals in the memory during a second period of time T2, wherein T2>T1. This is however not limitative.

According to some embodiments, one or more delay lines can be used and implemented using analog components, such as wires.

According to some embodiments, the delay applied by the processing unit 120 is controllable. For example, the processing unit 120 can control the delay which is applied based on various parameters, such as (but not limited to) data representative of the flight path of the aerial vehicle, data representative of the position of the device 100 (and/or of the position of the aerial vehicle on which the device 100 is embedded), values of delays which are pre-stored in a memory (such as a non-transitory memory, including e.g. volatile or non-volatile memory) and/or communicated to the device 100, etc.

In some cases, the delay can be equal to zero, and thus no delay is applied.

The processing unit 120 can in particular apply the delay to the electromagnetic signals sensed by the receiver 110 as such or after some preliminary processing.

According to some embodiments, the device 100 can be configured to apply a modulation to the received electromagnetic signals.

According to some embodiments, the processing unit 120 can be configured to perform this modulation (digital modulation). According to other embodiments, an external processing unit is configured to perform this modulation (such as the processing unit of the aerial vehicle), and can e.g. communicate the modulated electromagnetic signals to device 100. In some embodiments, the modulation is performed in an analog way.

Modulation may include e.g. frequency modulation, amplitude modulation, phase modulation, etc.

The processing unit 120 can be configured to modulate the electromagnetic signals after they have been delayed, and/or before they are delayed.

The device 100 can further comprise an emitter 150, for back transmitting the electromagnetic signals, in particular towards the radar, after their processing by the device 100. The emitter 150 can comprise e.g. one or more antennas.

According to some embodiments, the device 100 can comprise an amplifier (not represented), configured to amplify the electromagnetic signals within the device 100 before their back transmission.

According to some embodiments, the device 100 can comprise a memory (not represented, such as a non-transitory memory, including e.g. volatile or non-volatile memory), or the device 100 can communicate data with an external memory. In particular, the memory can store data representative of the flight of the aerial vehicle, data representative of the delays and/or modulations to be applied to the electromagnetic signals, etc.

In some embodiments, at least some of the modules of device 100 are already present in the aerial vehicle on which the device 100 is embedded. For example, the emitter and/or the receiver can be the emitter and/or the receiver of the aerial vehicle. In this case, the device 100 is operatively coupled with the emitter and/or the receiver of the aerial vehicle. This applies also to the non-transitory memory, and other possible components of device 100. In some embodiments, at least some of the functions performed by the processing unit 120 (such as delaying, modulating the signals, etc.) can be partially and/or totally performed by a processing unit of the aerial vehicle.

According to some embodiments, the device 100 is a transponder.

A method of calibrating a radar (although it will be referred to a radar, this applies to a radar and/or an antenna), using device 100, will now be described, with reference to FIGS. 2 and 3.

The calibration method can typically comprise sending electromagnetic signals from a radar 200 to the device 100 embedded on an aerial vehicle 210 (such as an unmanned aerial vehicle). In some embodiments, these electromagnetic signals can be processed by the device 100. The device 100 can transmit back the processed electromagnetic signals, which are sensed by the radar 200.

Based on the electromagnetic signals sensed by the radar 200, data representative of the position (range, angular position(s) along one or more axis, etc.) of the device 100 can be estimated by the radar 200 or by a processing unit in communication with the radar 200. Calibration can comprise comparing data representative of the position of the device 100 (or of the aerial vehicle 210) which were estimated by the radar 200 with data representative of the actual position of the device 100 (or of the aerial vehicle 210). The calibration can in particular calibrate bias and/or random errors of the radar. This is however not limitative.

The actual position of the device 100 and/or of the aerial vehicle 210 can be obtained using a localization device, such as GPS embedded on the aerial vehicle 210, inertial systems, etc. (these examples are not limitative). According to some embodiments, a differential GPS can be used. This is however not limitative.

According to some embodiments, the positions of the device 100 and of the aerial vehicle 210 are equal or can be approximated as equal. This is particularly true for aerial vehicles of limited dimensions, such for unmanned aerial vehicles.

According to some embodiments, the actual position of the aerial vehicle 210 can be obtained using one or more additional radars which can be e.g. pre-calibrated radars. These additional radars can be pre-calibrated using e.g. an antenna horn. An antenna horn allows pre-calibrating the additional radars according to the range axis. Thus, according to some embodiments, at least two additional radars, or three radars (which are pre-calibrated along the range axis using an antenna horn) are used to find the actual position of the aerial vehicle 210. The position estimated by these additional radars can be used in the different calibration methods described herein for calibrating a radar. This is particularly useful when no localization device is not present in the aerial vehicle, and/or when the localization device is faulty.

Thus, this obviates the need to rely on a localization device embedded on the device 100 and/or on the aerial vehicle 210. In FIG. 2, additional radars 250 are depicted, which can sense the electromagnetic signals transmitted back by the device 100.

Based on the comparison, which indicates the level of error in the radar measurements, the radar can be calibrated, that it to say that errors along one or more of the different spatial axes and/or angular axes (elevation, azimuth, etc.) can be estimated.

According to some embodiments, an inertial navigation system (INS) located in the radar, or operatively coupled with the radar, can be calibrated. The INS generally provides angular data (e.g. with respect to geographical North) and comprises an internal error which can be also calibrated using the various methods described hereinafter. In some embodiments, since the INS can be calibrated with an aerial vehicle flying at an actual short range (by simulating a higher range using the various embodiments described hereinafter), a more accurate calibration can be obtained.

According to some embodiments, a plurality of radars can be used. For example, at least one active radar 200 can emit electromagnetic signals towards space (and thus towards the aerial vehicle 210), and one or more radars 250 (receiving radars, which can be, but not necessarily, passive radars, such as antennas) can sense the electromagnetic signals transmitted by the device 100. Therefore, at least one of the radars 250 can be calibrated using the various methods described hereinafter.

Figure 3:
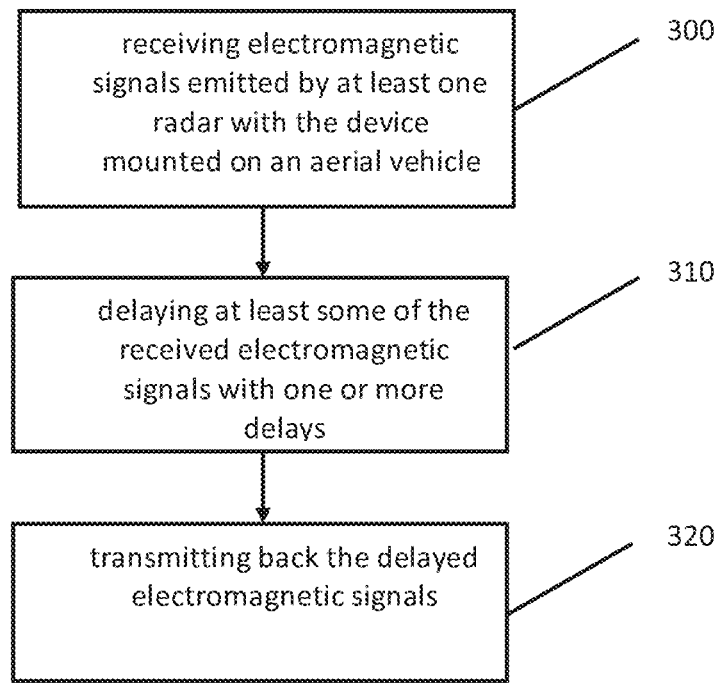
FIG. 3 illustrates an embodiment of a method of calibrating a radar.

FIG. 3 depicts an embodiment of particular operations that can be part e.g. of the calibration method of a radar.

The method can comprise (operation 300) receiving electromagnetic signals emitted by at least one radar 200 with the device 100 mounted on an aerial vehicle 210.

The method can further comprise (operation 310) delaying at least some of the received electromagnetic signals using the processing unit 120 of the device 100, and transmitting back (operation 320) the delayed electromagnetic signals, which are sensed by the radar.

Calibration of the radar can be performed based on these delayed electromagnetic signals.

The introduction of a delay simulates a virtual range of the device (or of the aerial vehicle) with respect to the radar.

Figure 2:
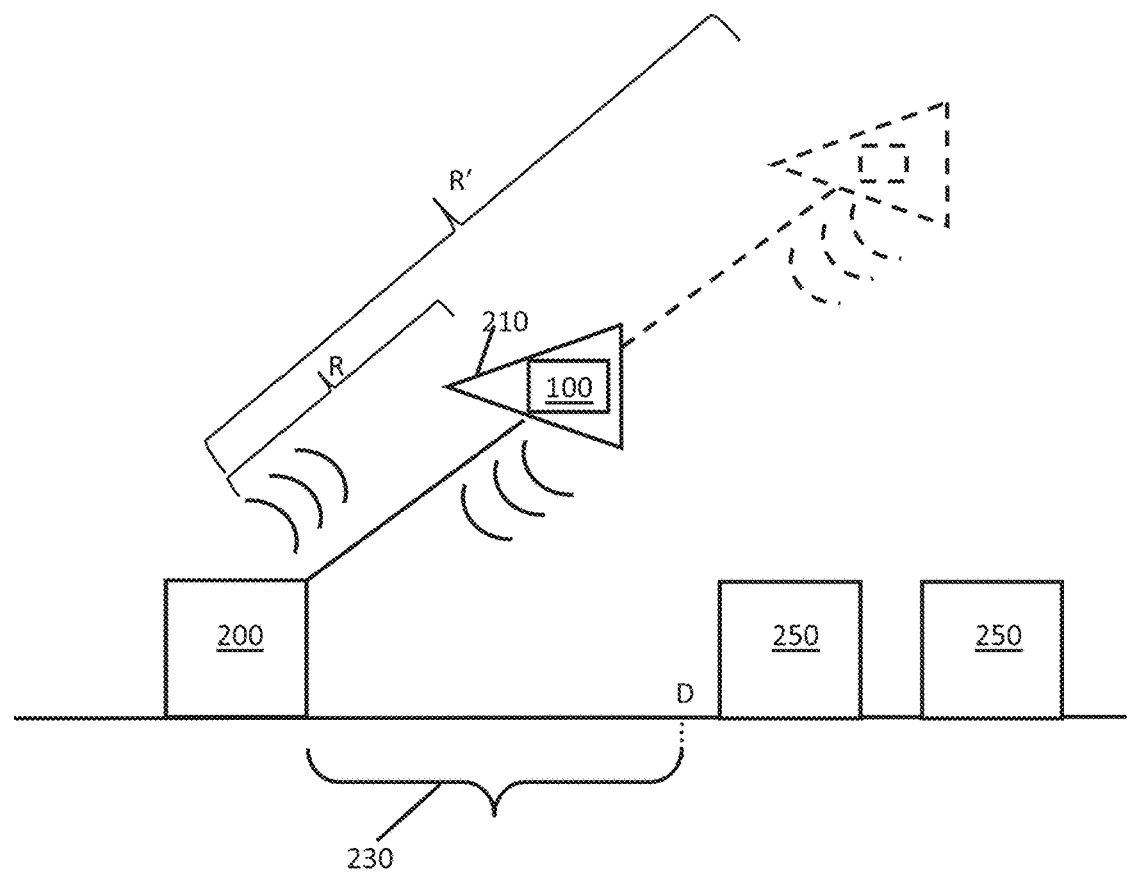
FIG. 2 illustrates an example in which the device of FIG. 1 simulates a virtual range of the aerial vehicle with respect to a radar.

Assume the device 100 (or the aerial vehicle 210) is located at a range R from the radar 200 (see FIG. 2).

Assume a delay $\Delta t_1$ is applied by the processing unit 120 on the received electromagnetic signals. As a consequence, when the delayed electromagnetic signals are transmitted back by the device 100 to the radar, this simulates a virtual range R' (which is correlated to $\Delta t_1$) of the device 100 (or of the aerial vehicle 210) with respect to the radar 200, wherein R' is different from R (in particular, R'>R).

In particular, R' is equal or approximately equal to R+c*$\Delta t_1$ (wherein c is the speed of light).

Thus, the radar can be calibrated as if the device 100 (or the aerial vehicle 210) were located at a virtual range R', which is different from the actual and current range R. As explained later in the specification, this can be used e.g. to:
calibrate the radar at this virtual range R', and/or
calibrate the radar at a given elevation angle (such as a high elevation angle) although the position of the device 100 (or the aerial vehicle 210) for which this given elevation angle is obtained is located within a proximity zone (such as a blind zone) of the radar.

According to some embodiments, the aerial vehicle has a trajectory which has a substantially constant azimuth angle with respect to the radar, but which has a varying elevation angle. This can be performed e.g. by making the aerial vehicle fly along a substantially vertical axis. In this case, the radar can be calibrated with respect to the azimuth direction only, and this allows decoupling the azimuth and elevation angles. The various embodiments described above and hereinafter (application of a delay to simulate a virtual range, application of a modulation to simulate a virtual radial velocity) can be used at one or more positions of the aerial vehicle flying along this trajectory.

According to other embodiments, the aerial vehicle has a trajectory which has a substantially constant elevation angle with respect to the radar, but which has a varying azimuth angle. Examples will be provided with reference to FIGS. 6B and 6C.

Figure 2A:
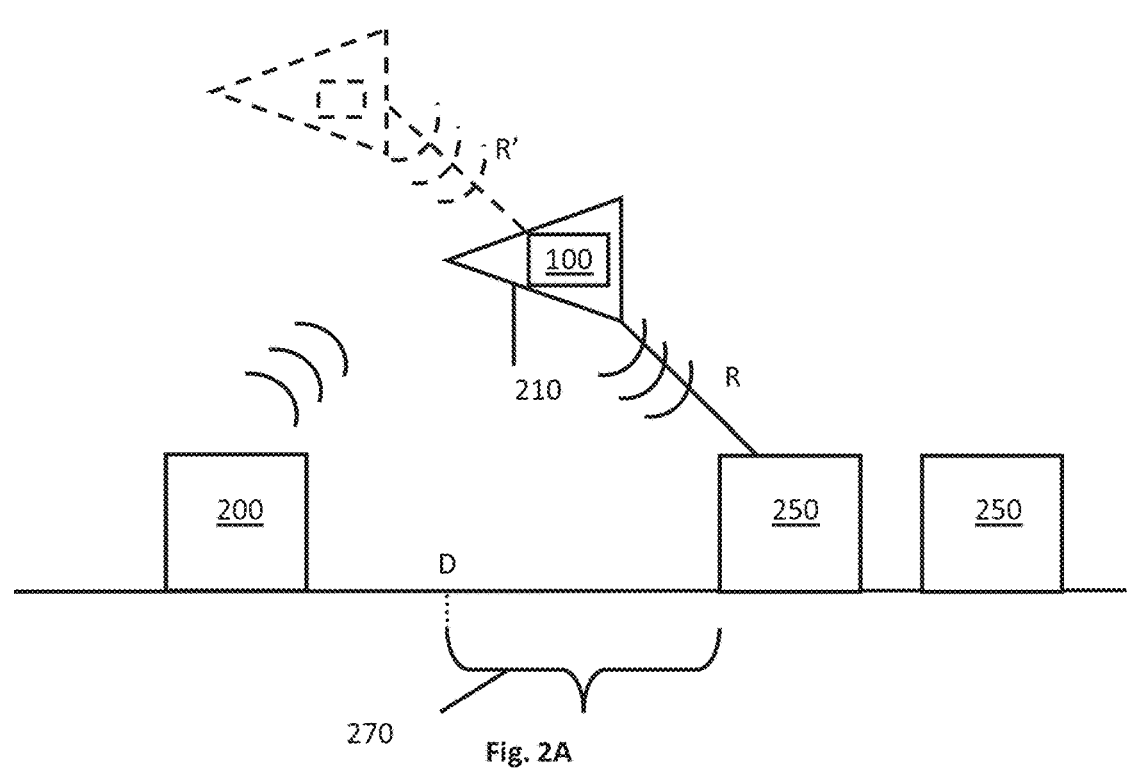
FIG. 2A illustrates an example in which the device of FIG. 1 simulates a virtual range of the aerial vehicle with respect to one or more passive radars or antennas.

If a plurality of radars are used, as illustrated in FIG. 2A, electromagnetic signals can be sent by a first radar 200, received and delayed by the device 100, then transmitted back towards a second radar 250. Thus, if the device 100 (or the aerial vehicle 210) is located at a range R from radar 250, the introduction of a delay simulates a virtual range R' from radar 250, which is different from the actual and current range R (in particular, R' is equal or approximately equal to R+c*$\Delta t_1$, wherein c is the speed of light and $\Delta t_1$ is the delay introduced by the device 100).

According to some embodiments, the method can comprise varying the delay applied by the processing unit 120 over time. As a consequence, the virtual range of the device with respect to the radar is varied over time.

In particular, the value of the delay can be varied during the flight of the aerial vehicle 210, based on different data representative of the position of the aerial vehicle 210.

According to some embodiments, the delay applied by the processing unit 120 is constant during the flight of the aerial vehicle.

According to some embodiments, the processing unit 120 can be configured to apply a predefined delay when the device 100 (or the aerial vehicle 210) enters a predefined proximity zone 230 of the radar 200. This can be performed similarly when the device 100 (or the aerial vehicle 210) enters a predefined proximity zone 270 of the radar 250 (see FIG. 2A). As explained below, this predefined delay can in particular be selected to simulate a virtual range of the device 100 (or of the aerial vehicle 210) which is out of the proximity zone of the radar.

According to some embodiments, the predefined proximity zone 230 (or 270) can correspond to a "blind zone" of the radar 200 (or of the radar 250). Indeed, radars are generally operated so that there exists a zone located in the vicinity of the radar (the size D of the zone depends on the radar), for which the radar is not able to detect targets. This is due notably to the fact that when this kind of radar is transmitting, the receiver is off, thereby creating a blind zone.

The proximity zone 230 (resp. 270) can be e.g. a sphere whose center is located around the radar and which has a radius D. This is however no limitative and the proximity zone can have a different shape.

The dimensions of the proximity zone 230 (resp. 270) are generally known in advance for each radar.

If the device 100 (or the aerial vehicle 210) is within the proximity zone 230 (resp. 270) of the radar 200 (resp. 250), the device 100 allows simulating as if the device 100 and the aerial vehicle 210 were located at a range R' which is out of the proximity zone 230 (resp. 270). This can be seen in FIGS. 2 and 2A.

Indeed, the value of the delay $\Delta t_1$ can be selected by the processing unit 120 so that the virtual range of the device 100 (or of the aerial vehicle 210) is located out of the blind zone of the radar.

As a consequence, the radar can be calibrated even if the device 100/aerial vehicle 210 are actually located within the blind zone of the radar.

According to some embodiments, and as illustrated in FIG. 2A, a plurality of radars need to be calibrated. In some cases, the selected delay can be chosen so as to simulate a virtual range of the device 100 which is located out of the blind zone of each (or at least some) of this plurality of radars. The selected delay can be computed based on an aggregation of the different blind zones, and on the actual position of the aerial vehicle, so as to simulate a range which is out of all the blind zones of the radars (or out of at least some of the blind zones of the radars).

In some embodiments, the selected delay can be varied during the flight path of the aerial vehicle so that each time the radar enters a blind zone of one of the radars, a delay is applied to simulate a virtual range which is out of the blind zone of this radar.

According to some embodiments, a plurality of radars are used. An active radar sends electromagnetic signals towards the device 100, which transmits back the electromagnetic signals towards one or more receiving radar(s)/antenna(s). The various calibration methods or testing methods described above and hereinafter can be used to calibrate and/or test the one or more receiving radar(s)/antenna(s). In particular, it can help understanding why a given receiving radar and/or an antenna is faulty.

Figure 4:
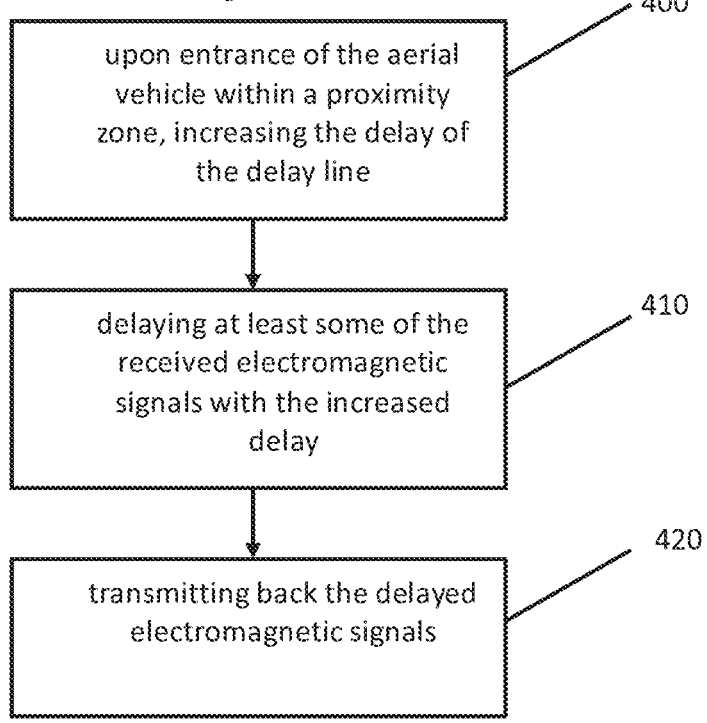
FIG. 4 illustrates an embodiment of processing which can be performed e.g. in the radar calibration of FIG. 3.

Attention is now drawn in FIG. 4.

As illustrated in FIG. 4, the method can comprise increasing the delay applied by the processing unit 120 when the device 100 (or the aerial vehicle 210) enters the predefined proximity zone 230 of the radar 200 (operation 400). This can be performed similarly when the device 100 (or the aerial vehicle 210) enters the predefined proximity zone 270 of the radar 250 (see FIG. 2A).

The increased delay can be applied to the received electromagnetic signals (operation 410) and then the delayed electromagnetic signals can be transmitted back (operation 420), as already explained with reference to FIG. 3.

It has been described that the introduction of the delay can simulate a virtual range of the device and of the aerial vehicle which is out of the proximity zone/blind zone of a radar.

According to some embodiments, the device and the aerial vehicle can be already out of the proximity zone of the radar, but it is desired to calibrate the radar for higher ranges, even if the aerial vehicle is not located at these higher ranges from the radar. The application of a delay can be used to simulate these positions with higher ranges, thus obviating the need for the aerial vehicle to fly at these higher ranges.

According to some embodiments, assume the device and the aerial vehicle are located at a first position within the proximity zone of a radar (the first position is located at a first actual range $R_1$ from the radar), and the processing unit is configured to apply a first delay $\Delta t_1$ (so as to simulate a first virtual range $R'_1$ which is out of the proximity zone). Assume the aerial vehicle moves to a second position (the second position is located at a second actual range $R_2$ from the radar, wherein $R_2 > R_1$) which is also within the proximity zone, or out of the proximity zone. The processing unit can be configured to decrease the value of the applied delay from $\Delta t_1$ to $\Delta t_2$, wherein $\Delta t_2 < \Delta t_1$.

According to some embodiments, it is desired to calibrate the radar for different range values, and/or for different relative angles (e.g. elevation/azimuth angles) between the aerial vehicle and the radar.

Figure 4A:
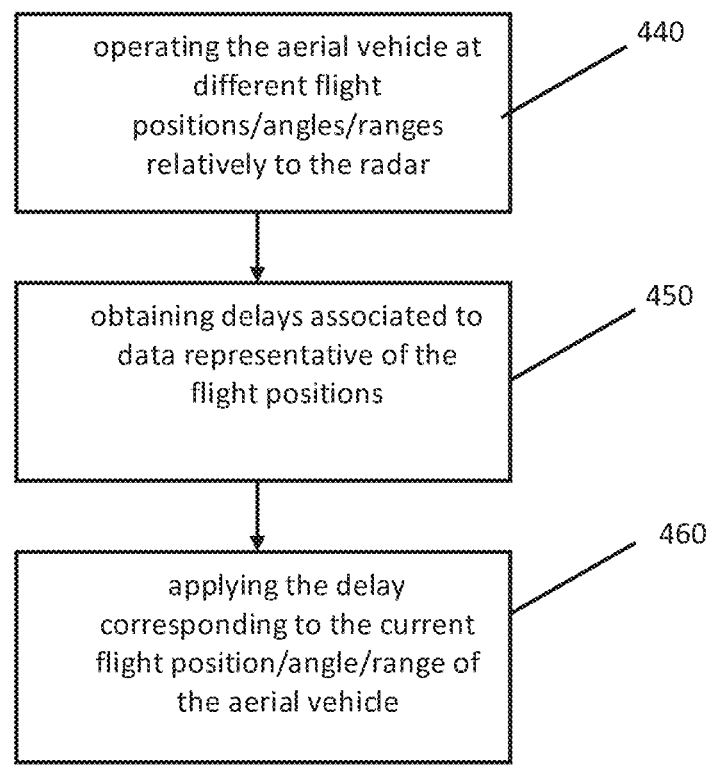
FIG. 4A illustrates an embodiment of calibrating a radar for different range values, and/or for different relative angles.

A method can comprise operating (see FIG. 4A, operation 440) the aerial vehicle 210 along a flight path which allows calibrating the radar for different range values (with respect to the radar) and/or relative angles (with respect to the radar). For each range and/or relative angle value (along one or more axis), comparison between the data estimated by the radar (range, angle, etc.) with the data representative of the actual position of the device or of the aerial vehicle can be performed to calibrate the radar, as explained above.

In particular, as mentioned above, the method can comprise, upon entrance of the aerial vehicle to the proximity zone (blind zone), applying a delay whose value is selected to allow simulating an appropriate virtual range. In particular, this can comprise applying a delay which simulates a virtual range which is out of the proximity zone.

The application of the delay can comprise obtaining from a memory, pre-stored values of delays which are associated with data representative of the flight positions of the aerial vehicle (operation 450). Data representative of the flight positions include e.g. actual ranges, actual relative angles, actual positions of the device and/or of the aerial vehicle, etc.

In other words, the appropriate delay values can be stored and associated to predefined flight positions of the aerial vehicle. In particular, these data stored in the memory can be such that when the aerial vehicle is located at a given predefined flight position, the corresponding delay value stored in the memory can be extracted and applied (operation 460). Operations 450 and 460 described in FIG. 4A can be performed e.g. by the device 100.

According to some embodiments, the pre-stored values of delays are stored in the memory with respect to time, that is to say that for each period of time of the flight of the aerial vehicle (the flight path of the aerial vehicle is generally known in advance), corresponding values of delays are stored, which allow simulating appropriate virtual ranges during the flight of the aerial vehicle.

Figure 5:
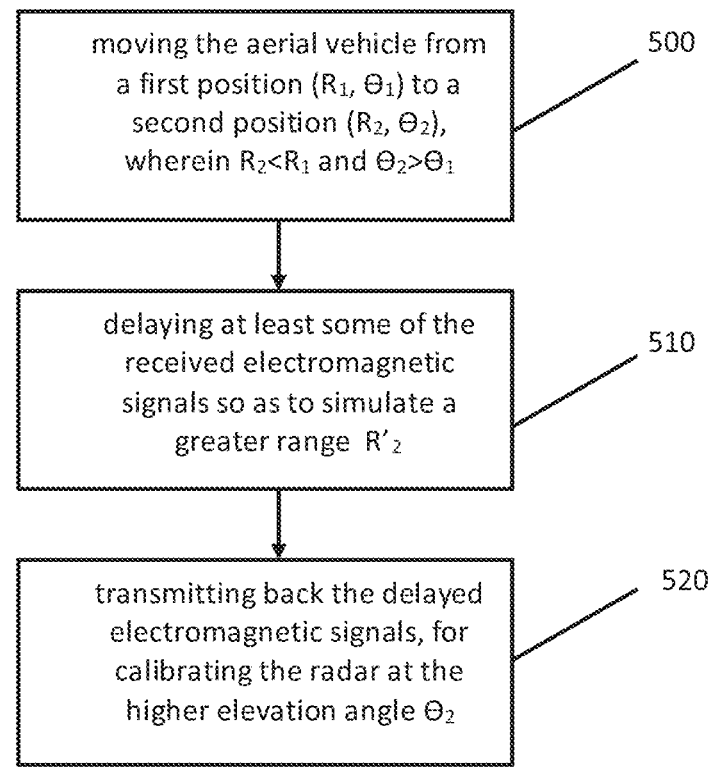
FIG. 5 illustrates an embodiment of a method of calibrating a radar at high elevation angle.

Attention is now drawn to FIG. 5.

When it is desired to calibrate the radar (or an antenna) along the elevation direction (e.g. within a predefined range of the elevation angle such as 0 to 90 degrees, or even 0 to 180 degrees, these values being not limitative), a method can comprise making the aerial vehicle fly along a flight path which covers at least part of this range of elevation angles.

In order to calibrate at high elevation angles, it is generally necessary to make the aerial vehicle increase its altitude. However, if the aerial vehicle is limited in its flight altitude, it is problematic to calibrate the radar at high elevation angles. This is in particular the case of an unmanned aerial vehicle, which cannot fly above given altitudes, due to physical limitations and also, in some cases, due to flight regulations.

Figure 5A:
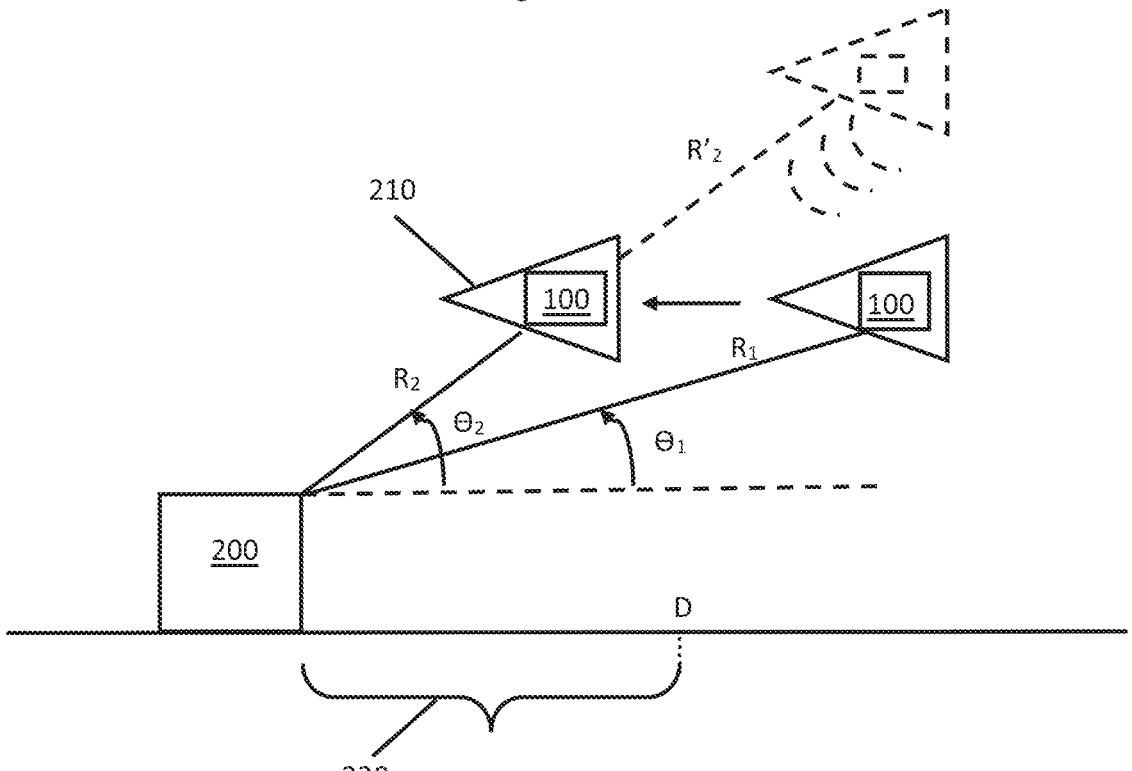
FIG. 5A illustrates an example of the method of FIG. 5.

Assume (see FIG. 5A) the aerial vehicle is located at a first position, with a range $R_1$, and with a given elevation angle $\Theta_1$. If it is desired to calibrate the radar at a higher elevation angle $\Theta_2$, wherein $\Theta_2 > \Theta_1$, the method can comprise (operation 500) making the aerial vehicle approach the radar, so as to increase the elevation angle. In particular, the method can comprise making the aerial vehicle move from a first position ($R_1$, $\Theta_1$) to a second position ($R_2$, $\Theta_2$) wherein $R_2 < R_1$ and $\Theta_2 > \Theta_1$.

According to some embodiments, the method can comprise (operation 510) applying a delay to the electromagnetic signals received by the device 100 at the second position, so as to simulate a range $R'_2$ which is greater than $R_2$. This can be used in particular if the second position is located within the proximity zone 230 (blind zone) of the radar.

Based on the transmitted delayed electromagnetic signals, the radar can be calibrated at the higher elevation angle $\Theta_2$, although the aerial vehicle is located within the blind zone.

According to some embodiments, steps 500 to 520 can be iterated, so as to test a higher elevation angle $\Theta_3$, wherein $\Theta_3 > \Theta_2$. In this iteration, the aerial vehicle moves from the second position to a third position which is closer to the radar than the second position, and at which another delay (of higher value than the delay applied at the second position) is applied.

The steps can be repeated until a complete range of elevation angles has been tested.

The method described in FIG. 5 can be performed the other way round, that is to say that the aerial vehicle is first located close to the radar and then moves away from the radar. In this case, the aerial vehicle can move from a first position ($R_1$, $\Theta_1$) to a second position ($R_2$, $\Theta_2$), wherein $R_2 > R_1$ and $\Theta_2 < \Theta_1$. The delay applied at the second position is lower than the delay applied at the first positon. These steps can be iterated, and the aerial vehicle can move from the second position ($R_2$, $\Theta_2$) to a third position ($R_3$, $\Theta_3$), wherein $R_3 > R_2$ and $\Theta_3 < \Theta_2$. The delay applied at the third position is lower than the delay applied at the second position.

A combination of these methods can be applied, that is to say that the aerial vehicle can approach the radar, then move away from the radar, then approach again the radar (etc.), and the appropriate delay values can be applied in response to the flight path of the aerial vehicle.

Figure 6A:
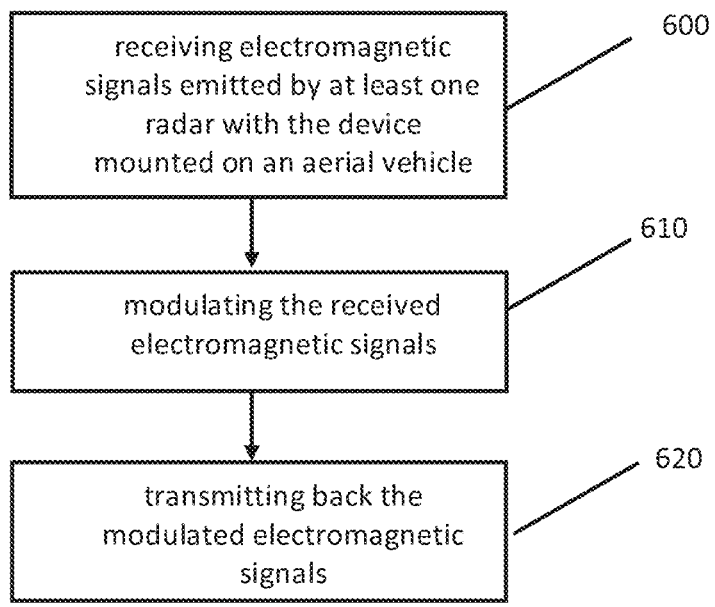
FIG. 6A illustrates an embodiment of processing which can be performed e.g. in the radar calibration of FIG. 3.

Attention is now drawn to FIG. 6A.

According to some embodiments, a method can comprise receiving the electromagnetic signals by the device mounted on the aerial vehicle (operation 600), and modulating (e.g. by the processing unit 120) the received electromagnetic signals (operation 610). The modulated electromagnetic signals can then be transmitted back (operation 620).

This modulation can be performed in addition to the delay applied by the processing unit, and/or even if no delay is applied by the processing unit.

Examples of modulations include, as mentioned above, amplitude modulation, phase modulation, frequency modulation, etc.

The introduction of a modulation in the received electromagnetic signals allows simulating a radial velocity $\dot{R}'$ of the device (and thus of the aerial vehicle) which is different from the actual radial velocity $\dot{R}$ of the device/aerial vehicle.

According to some embodiments, the modulation can be performed as follows. When the electromagnetic signal is received, the device 100 can be configured to store it in a memory at a given writing rate. Then, the electromagnetic signal can be read and extracted from the memory at a given reading rate. The difference between the writing rate and the reading rate has an impact on the frequency of the electromagnetic signals, and thereby, on the simulated radial velocity.

Assume the Doppler frequency which is introduced in the signal is $f_{doppler}$, which can be written as $f_{doppler} = 2 * V / \lambda$, wherein V is the velocity of the aerial vehicle, and $\lambda$ the wavelength of the electromagnetic signals. $f_{doppler}$ is correlated to the difference between the writing rate and the reading rate. Thus, by changing this difference, $f_{doppler}$ can be changed, and in turn, the virtual velocity of the device/aerial vehicle.

The modulation adds at least one new frequency to the electromagnetic signals and introduces a Doppler effect in the electromagnetic signals which simulates a different radial velocity than the actual one.

Indeed, if the actual radial velocity of the aerial vehicle is zero or below a predefined threshold, the radar does not detect the aerial vehicle. The simulated radial velocity can allow detection of the aerial vehicle even if the actual radial velocity is not sufficient.

The radial velocity is the velocity measured along the range axis, and corresponds to the derivative of the range.

If a modulation is applied together with a delay to the received electromagnetic signals, both a virtual range and a virtual radial velocity of the device can be simulated.

According to some embodiments, a constant modulation is applied during the flight of the aerial vehicle. According to other embodiments, the processing unit is configured to change the modulation which is applied to the electromagnetic signals over time. For example, the modulation which is applied over time can depend on data representative of the flight of the aerial vehicle, such as its position, its velocity, etc.

Thus, the radar can be calibrated (or tested) using an aerial vehicle which has a virtual range and/or a radial velocity which are different from its actual range and/or radial velocity.

Figure 6B:
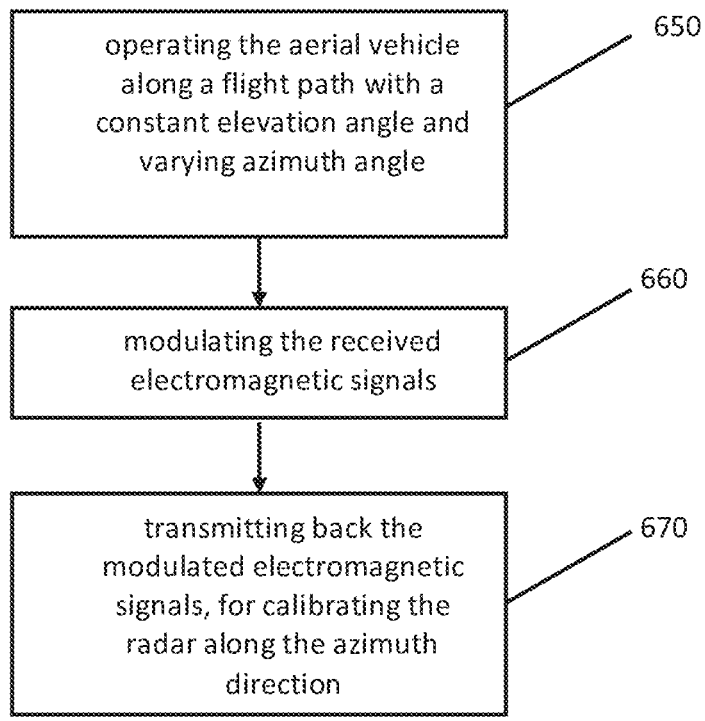
FIG. 6B illustrates an embodiment of a method of calibrating a radar along the azimuth direction, with a substantially constant elevation angle.
Figure 6C:
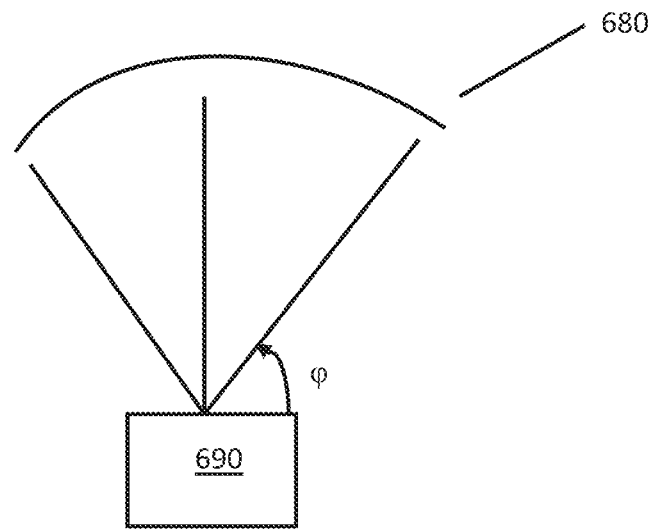
FIG. 6C illustrates an example of the method of FIG. 6B.

Attention is now drawn to FIGS. 6B and 6C.

The method can comprise operating (operation 650) the aerial vehicle along a flight path which has a substantially constant elevation angle with respect to the radar, but which has a varying azimuth angle $\varphi$, for calibrating the radar along the azimuth direction (operation 670). In some embodiments, the flight path is such that the elevation angle does not vary more than 10 degrees.

During this flight path, the received electromagnetic signals can be modulated (operation 660). Thus, although the device (and the aerial vehicle) has an actual radial velocity $\dot{R}$ with respect to the radar which is zero, or below a predefined threshold, the introduction of the modulation simulates a virtual radial velocity $\dot{R}'$ which is non zero or above the predefined threshold.

The method described in FIG. 6B allows calibrating the radar along the azimuth direction only. Thus, the calibration along the azimuth direction and the calibration along the elevation direction can be decoupled, which provides more accurate results.

A typical flight path 680 is illustrated in FIG. 6B, in which the azimuth angle $\varphi$ is varying between −60 degrees and +60 degrees, and the elevation angle is constant. This flight path 680 can be described as a portion of a circle whose center is located at the position of the radar 690. This is however not limitative.

In other embodiments, the flight path of the aerial vehicle is such that the azimuth angle is constant, and the elevation angle varies, so as to calibrate the radar in the elevation direction.

Figure 7:
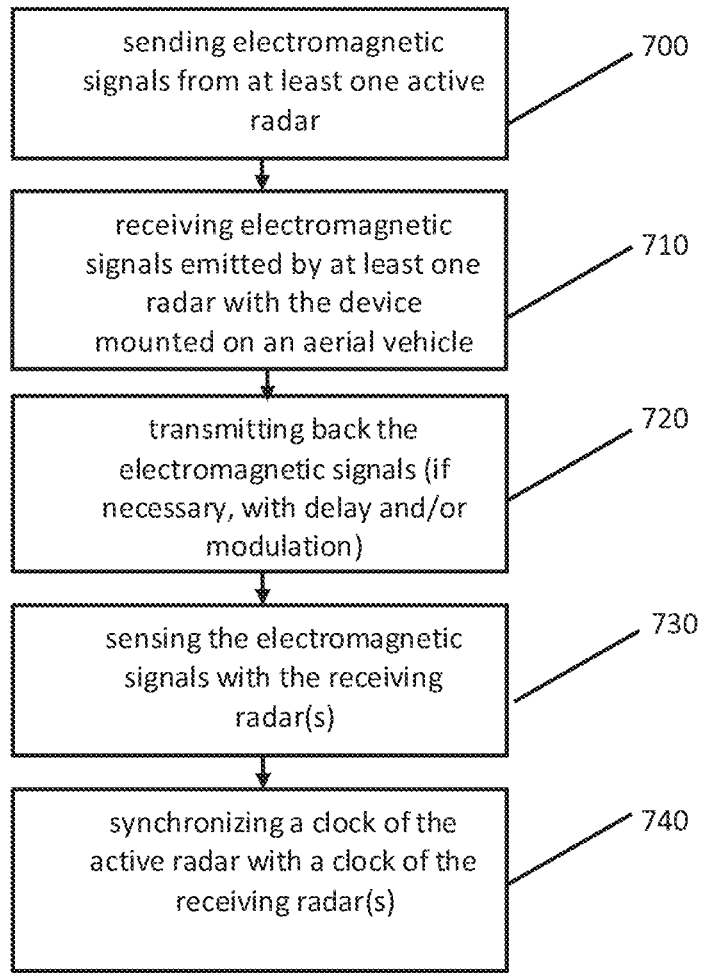
FIG. 7 illustrates an embodiment of a method of synchronizing a plurality of radars.

Attention is now drawn to FIG. 7. FIG. 7 describes a method in which clocks of different radars can be calibrated (this process is also called clock synchronization).

As already mentioned with reference to FIG. 2, a plurality of radars can be used (see radars 200, 250), in which at least some of the radars are active radars, and at least some of the radars (receiving radars) are configured to receive the electromagnetic signals transmitted back by the device mounted on the aerial vehicle. The receiving radars can be in some embodiments also active radars.

A method can comprise sending electromagnetic signals from at least one active radar (operation 700), receiving electromagnetic signals emitted by the active radar with the device mounted on an aerial vehicle (operation 710) and transmitting back (operation 720) the electromagnetic signals. If necessary, the electromagnetic signals can be transmitted back with a delay and/or a modulation as described in the various embodiments above (depending e.g. on the position of the aerial vehicle such as when the aerial vehicle is within a blind zone of one of the plurality of radars, a delay can be introduced). In addition, if the aerial vehicle has a radial velocity which is zero or below a predefined threshold, the modulation introduced in the electromagnetic signals simulates a virtual radial velocity which is non-zero or above the predefined threshold.

The different embodiments that were already described above for calibration radars (see FIGS. 3 to 6) apply similarly to this method of synchronization of radars, and are not described again.

The method can further comprise sensing the electromagnetic signals with the receiving radar(s) (operation 730).

The method can further comprise synchronizing (operation 740) a clock of the active radar with a clock (or clock(s)) of the receiving radar(s). The synchronization can be performed by a processing unit, such as a processing unit associated with one of the radars, or the processing unit of the device, or another processing unit.

Since the position of the aerial vehicle is known (using a localization device, as a GPS embedded in the aerial vehicle, INS, or other devices, etc.), and since the time of emission of the electromagnetic signals from the active radar(s) and the time of reception of the electromagnetic signals by the receiving radar(s) are known, the bias between the clocks can be estimated, for synchronizing these clocks.

The data which are required to perform the synchronization can be transmitted to the processing unit which performs the synchronization.

By using the different embodiments described above, synchronization of the radars can performed using an aerial vehicle which has a virtual range and/or a radial velocity which are different from its actual range and/or radial velocity.

According to some embodiments, the synchronization of the plurality of radars can be performed at the same time.

Figure 8A:
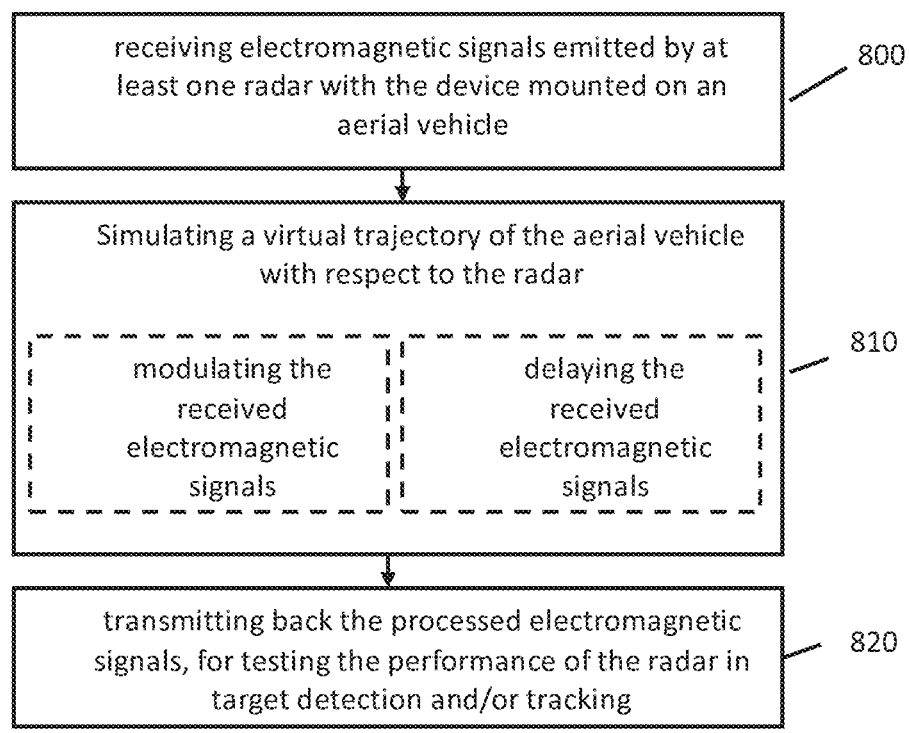
FIG. 8A illustrates an embodiment of a method of testing the performance of a radar in target detection and/or target tracking.
Figure 8B:
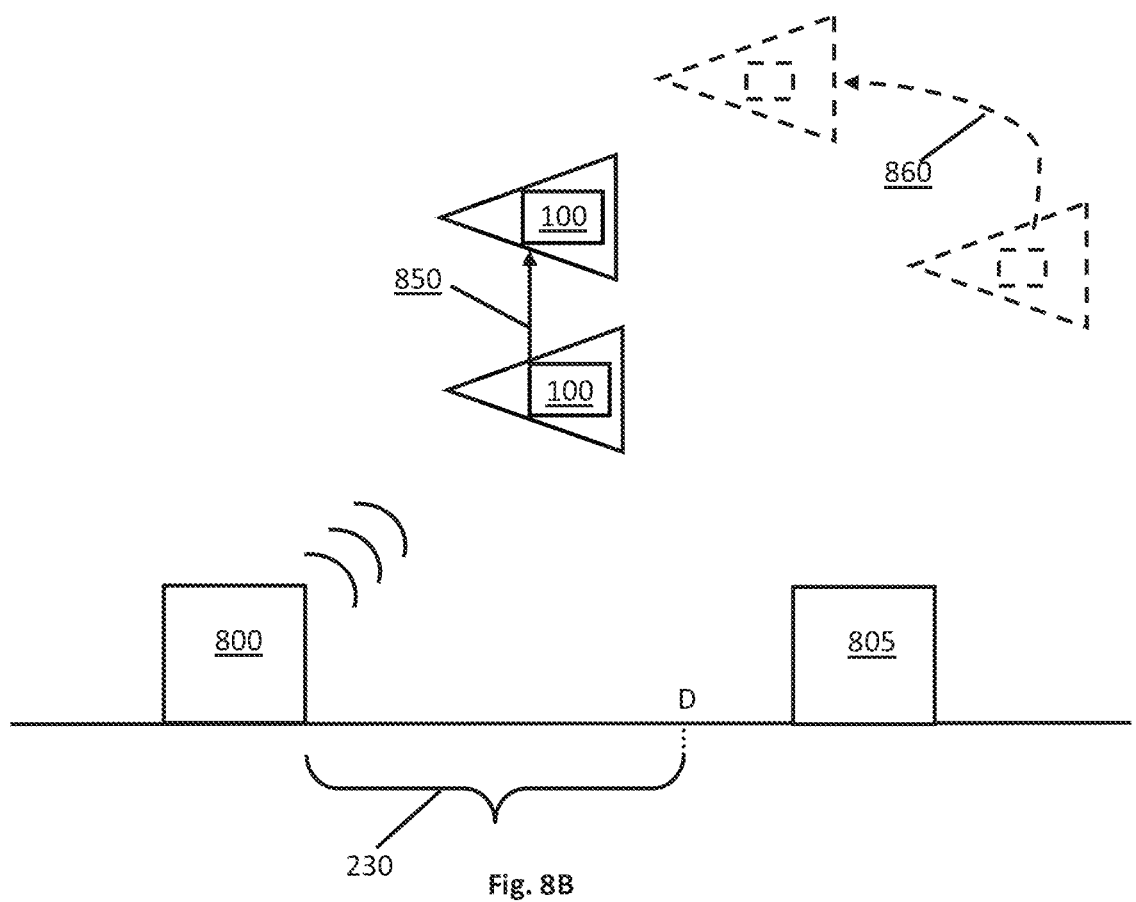
FIG. 8B illustrates an example of the method of FIG. 8A.

Attention is now drawn to FIGS. 8A and 8B.

A radar can be used for detecting and/or for tracking targets which are moving in space.

According to some embodiments, performance of the radar in detecting and/or tracking targets can be tested and/or examined using the device 100 described in the various embodiments described above.

A method of testing the radar can comprise (operation 800) receiving electromagnetic signals by a device 100 mounted on an aerial vehicle. This aerial vehicle can be e.g. an unmanned aerial vehicle.

These electromagnetic signals are sent by a radar 800 (see FIG. 8B). As already explained above, in some embodiments, a plurality of radars can be used, that is to say that at least one radar 800 is an active radar and sends electromagnetic signals towards the device 100, which transmits back the manipulated electromagnetic signals towards receiving radars 805.

The method can further comprise (operation 810) simulating a virtual trajectory of the aerial vehicle with respect to the radar 800 (or with respect to radar 805). This simulation can be performed by delaying the received electromagnetic signals, as explained with reference to FIGS. 3 and 4. As already explained, the introduction of the delay allows simulating a virtual range of the aerial vehicle with respect to the radar, which is different from the actual range of the aerial vehicle with respect to the radar.

For example, while the aerial vehicle is moving along a given trajectory, the processing unit of the device 100 can vary the delay applied to the received electromagnetic signals, so as to simulate a virtual trajectory of the aerial vehicle. This is shown e.g. in FIG. 8B, in which the aerial vehicle is moving along an actual flight path 850, but the radar 800 (or the radar 805) "sees" the aerial vehicle as if it was moving in the virtual flight path 860.

According to some embodiments, a modulation can be introduced in the received electromagnetic signals, as explained with reference to FIG. 6.

This modulation introduces a virtual radial velocity in the virtual trajectory of the aerial vehicle. Thus, this modulation also helps simulating the desired trajectory. Indeed, the introduction of a radial velocity can simulate e.g. a curvature in the virtual trajectory.

According to some embodiments, an operator can require the simulation of a given virtual trajectory, for testing the radar and check its performances with respect to this trajectory. The corresponding actual flight path of the aerial vehicle, and the delays and/or modulations to be applied can be computed by a processing unit, and stored in a non-transitory memory (hereinafter "flight data"). During the actual flight of the aerial vehicle, a processing unit of the device and/or of the aerial vehicle can obtain the flight data, in order to control the flight path of the aerial vehicle, the delay and/or the modulation to be applied, in accordance with the flight data.

Depending on data representative of the position of the aerial vehicle, and/or on the velocity or acceleration of the aerial vehicle:
- only a delay is applied to the received electromagnetic signals, or
- only a modulation is applied to the received electromagnetic signals,
- both a delay and both a modulation are applied to the received electromagnetic signals, or
- neither a delay nor a modulation are applied to the received electromagnetic signals, which are transmitted back without these processing.

The modulation and/or the delay to be applied depend on the virtual trajectory that is to be simulated, and also on the actual trajectory of the aerial vehicle.

According to some embodiments, particular virtual trajectories can be simulated, such as of a projectile, of a rocket, of a plane, of an aircraft performing a maneuver, etc. This is however not limitative.

Figure 9A:
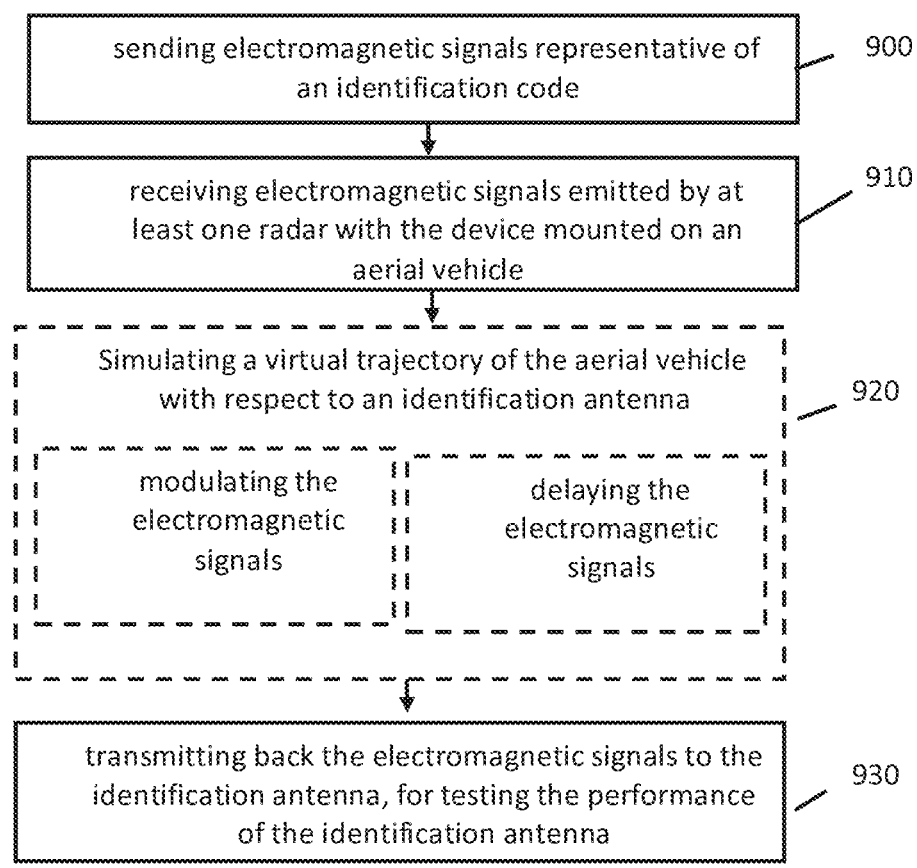
FIG. 9A illustrates an embodiment of a method of testing the performance of an identification system, such as an IFF system.

Attention is now drawn to FIGS. 9A and 9B.

In order to identify aerial vehicles, such as civilian or non-civilian aircrafts, it is known to use an identification system. An example of an identification system is the "Identification, friend or foe" system (hereinafter IFF system) or "ADS-B" (Automatic dependent surveillance—broadcast).

Generally, in an identification system, at least one antenna (e.g. IFF antenna) receives electromagnetic signals representative of an identification code transmitted by a transponder of an aircraft. This identification code identifies the aircraft.

A processing unit associated to the identification antenna can compare the received identification code to a repository of identification codes, in order to perform an identification of the aircraft.

In order to test the identification system, a method (see FIG. 9A) can comprise sending electromagnetic signals representative of an identification code to the device 100 embedded on an aerial vehicle (operation 910), such as an unmanned aerial vehicle. These electromagnetic signals can be generated by a processing unit, or by a transponder, located e.g. on the ground and which can exchange data with the identification antenna, so as to simulate a given identification code. These electromagnetic signals can be sent by a radar or by the identification antenna itself.

The device 100 can process the received electromagnetic signals as already explained in the various embodiments described above (such as by introducing a delay, and/or a modulation, etc.).

The electromagnetic signals can be transmitted back to the identification antenna which can then attempt to recognize the identification code (operation 930). It is thus possible to test if the identification antenna is successful in recognizing the identification code, since the identification code which was sent is known.

In some embodiments, if a plurality of identification antennas are used, the electromagnetic signals can be transmitted back to one or more other identification antenna(s) 980.

According to some embodiments, a delay can be introduced by the device, in order to simulate a virtual range of the aerial vehicle. As already explained above, this can be useful e.g. when the aerial vehicle is located in a blind zone of the IFF antenna. Other embodiments were described above and can be used similarly in this method of testing the identification antenna.

According to some embodiments, a modulation can be introduced in order to simulate a virtual radial velocity of the aerial vehicle.

According to some embodiments, it is desired to test the identification antenna for a given trajectory of the aerial vehicle (operation 920). For example, it is desired to check if the identification antenna is properly operating when the aerial vehicle which transmits back the identification code is performing a given manoeuvre.

In this case, the electromagnetic signals representative of the identification code can be manipulated similarly to what was described in FIG. 8A, in order to simulate a virtual trajectory of the aerial vehicle.

Thus, while a virtual trajectory of the aerial vehicle is simulated, the IFF antenna can be tested as described above.

An example is depicted in FIG. 9B, in which the virtual trajectory 960 is simulated, while the aerial vehicle is in fact flying along the actual trajectory 950. Thus, the identification system can be tested with respect to a target moving along the virtual trajectory 960.

In particular, the identification antenna can be tested with respect to a target moving along a typical trajectory of a given aircraft, without needing to make this aircraft fly, by simulating this typical trajectory using the device mounted on an aerial vehicle, such as an unmanned aerial vehicle.

Assume the identification antenna has to be tested with respect to a given aircraft. The method can comprise transmitting the aircraft identification code of this given aircraft to the device, and simulating a virtual trajectory (as explained in operation 920 of FIG. 9A) of the given aircraft using the device embedded on an aerial vehicle. For example, it is known that a civilian aircraft has a particular trajectory, and the virtual trajectory can model this particular trajectory.

The method described in FIG. 9A can be repeated for several different identification codes, and/or for several different virtual trajectories simulated using the device mounted on the aerial vehicle.

According to some embodiments, a method of testing a radar and/or an antenna is provided. In the prior art, near field calibration/test of a radar and/or an antenna was performed by introducing the radar and/or the antenna in a near-field room.

According to some embodiments, the different methods described above can be used to test at least one of the radar/antenna beam, and/or calibration coefficients of the antenna.

Test of the antenna beam includes e.g. test of the shape of the beam, and of the different properties of the beam.

The calibration coefficients correspond to the coefficients applied by each element (radiating element) of the antenna (such as an antenna array) in the phase and/or amplitude of the signal. Each element of the antenna generally comprises a channel which applies a phase and/or amplitude modification to the electromagnetic signal before their transmission by the radar or antenna, according to these calibration coefficients. These calibration coefficients need to be calculated.

Based on the electromagnetic signals transmitted back by the device, the different parameters of the antenna cited above (parameters of the beam, calibration coefficients) can be calculated.

The use of the device mounted on the aerial vehicle thus ensures a test in real conditions, which is more accurate.

In addition, various elevation angles can be tested, thereby avoiding clutter interferences or refractions. According to some embodiments, a low power of the electromagnetic signals sent by the radar or antenna to the device in order to reduce clutter interferences from the environment. This is however not limitative.

The invention contemplates a computer program being readable by a computer for executing at least part of one or more methods of the invention. The invention further contemplates a machine-readable memory tangibly embodying a program of instructions executable by the machine for executing at least part of one or more methods of the invention.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A device for calibrating a radar or an antenna, said device being configured to be embedded on an aerial vehicle, the device being configured to receive at least one electromagnetic signal, the device comprising:
   a processor and memory circuitry,
      wherein the aerial vehicle is configured to move along a plurality of different positions relative to said at least one radar or antenna,
      wherein, for each given position of the plurality of different positions:
      the device is configured to delay said at least one electromagnetic signal to simulate a virtual range of the device or of the aerial vehicle with respect to said at least one radar or antenna, said virtual range being different from an actual range of the device or of the aerial vehicle located at said given position with respect to said at least one radar or antenna, and
      wherein the processor and memory circuitry is configured to perform a modulation of said at least one electromagnetic signal before its back transmission to simulate a virtual radial velocity of the device or of the aerial vehicle which is different from an actual radial velocity of the device or of the aerial vehicle,
      wherein the actual radial velocity is equal to or below a velocity threshold for which said at least one radar or antenna does not detect a target,
      wherein the virtual radial velocity is higher than the velocity threshold, thereby enabling detection of the device or of the aerial vehicle by said at least one radar or antenna,
      wherein the device is configured to provide said at least one electromagnetic signal after said delay and said modulation to an emitter for its back transmission, thereby obtaining at least one transmitted electromagnetic signal, and
      wherein said at least one transmitted electromagnetic signal, which simulates a virtual range of the device or of the aerial vehicle with respect to said at least one radar or antenna and a virtual radial velocity of the device or of the aerial vehicle, is usable to calibrate said at least one radar or antenna.

2. The device of claim 1, configured to control said delay so as to make it vary over time according to one or more delay values, wherein each delay value simulates a virtual range of the device or of the aerial vehicle with respect to at least one radar receiving said at least one transmitted electromagnetic signal, said virtual range being different from an actual range of the device or of the aerial vehicle with respect to said at least one radar or antenna, for calibrating said at least one radar or antenna based on said at least one transmitted electromagnetic signal which simulates a virtual range of the device or of the aerial vehicle with respect to said at least one radar or antenna.

3. The device of claim 1, configured to apply a given delay when at least one of the device and the aerial vehicle is in a proximity zone of the radar or antenna or enters a proximity zone of the radar or antenna, wherein said given delay simulates a virtual range of the device or of the aerial vehicle which is out of said proximity zone.

4. The device of claim 1, configured to communicate with a memory storing data representative of delay values, wherein data representative of each delay value is associated with data representative of the flight path of the aerial vehicle, wherein the device is configured to delay the at least one electromagnetic signal based at least on said data representative of delay values and said data representative of the flight path of the aerial vehicle.

5. The device of claim 1, wherein the calibration includes at least one of: bias calibration, and power loss or energy loss calibration.

6. The device of claim 1, wherein a change in a virtual range of the device or of the aerial vehicle in a given period of time is different from a simulated radial velocity of the device or of the aerial vehicle in said given period of time.

7. The device of claim 1, wherein the processor and memory circuitry is configured to modulate said electromagnetic signal when the aerial vehicle has a flight path with a substantially constant elevation angle with respect said at least one radar or antenna, and a varying azimuth angle, for calibrating the radar or antenna along an azimuth direction.

8. The device of claim 1, configured to simulate a virtual trajectory of the device or of the aerial vehicle with respect to the radar or the antenna, said simulation comprising performing at least one of:
   controlling the delay according to one or more delay values, wherein each delay value simulates a virtual range of the device or of the aerial vehicle with respect to said radar or antenna, said virtual range being different from an actual range of the device or of the aerial vehicle with respect to said radar or antenna, and
   applying a modulation to said at least one electromagnetic signal, in order to simulate a virtual radial velocity of the device or of the aerial vehicle, said virtual radial velocity being different from an actual radial velocity of the device or of the aerial vehicle.

9. The device of claim 1, wherein said device is embedded on an unmanned aerial vehicle.

10. A system for calibrating a radar or an antenna, comprising:
    a device according to claim 1, said device being embedded on an unmanned aerial vehicle, and
    an additional processor and memory circuitry configured to compare data representative of the position of the aerial vehicle calculated by said at least one radar or antenna with data representative of the position of the aerial vehicle, for calibrating said at least one radar or antenna.

11. The system of claim 10, wherein the data representative of the position of the aerial vehicle is calculated by one or more additional pre-calibrated radars.

12. A system for synchronizing a plurality of radars or antennas, wherein said plurality of radars or antennas comprises at least one active radar or antenna and at least one receiving radar or antenna, wherein said system comprises:
    the device according to claim 1, said device being embedded on an unmanned aerial vehicle, and
    a processor and memory circuitry configured to determine a clock offset between a clock of the active radar or antenna and a clock of the receiving radar or antenna, based on electromagnetic signals sent by the active radar or antenna, sensed by the device and transmitted back towards the receiving radar or antenna, and based on data representative of the position of the device or of the unmanned aerial vehicle.

13. A system for calibrating a radar or an antenna, comprising:
    the device according to claim 1, said device being embedded on an unmanned aerial vehicle, and
    an additional processor and memory circuitry configured to determine, based on the electromagnetic signal transmitted by the device, at least one of data representative of the beam emitted by the radar or antenna, and data representative of coefficients of radiating elements of the antenna, said coefficients being representative of the phase or amplitude modification applied by said radiating elements to signals of the radar or antenna, before their transmission.

14. An unmanned aerial vehicle comprising the device of claim 1.

15. A method of calibrating at least one radar or antenna, the method comprising:

for an aerial vehicle moving along a plurality of different positions relative to said at least one radar or antenna, performing, for each given position of the plurality of different positions:
  receiving an electromagnetic signals with a device mounted on the aerial vehicle,
  delaying the electromagnetic signals by said device to simulate a virtual range of the device or of the aerial vehicle with respect to said at least one radar or antenna, said virtual range being different from an actual range of the device or of the aerial vehicle located at said given position with respect to said radar or antenna, and
  performing a modulation of said electromagnetic signal before its back transmission to simulate a virtual radial velocity of the device or of the aerial vehicle which is different from an actual radial velocity of the device or of the aerial vehicle, wherein the actual radial velocity is equal to or below a velocity threshold for which said at least one radar or antenna does not detect a target, wherein the virtual radial velocity is higher than the velocity threshold, thereby enabling detection of the device or of the aerial vehicle by said at least one radar or antenna,
  transmitting the electromagnetic signal after said delay and said modulation to an emitter for its back transmission, thereby obtaining a transmitted electromagnetic signal, wherein said transmitted electromagnetic signal, which simulates a virtual range of the device or of the aerial vehicle with respect to said at least one radar or antenna and a virtual radial velocity of the device or of the aerial vehicle, is usable to calibrate said at least one radar or antenna.

16. The method of claim 15, comprising controlling said delay so as to make it vary over time according to one or more delay values, wherein each delay value simulates a virtual range of the device or of the aerial vehicle with respect to at least one radar receiving said transmitted electromagnetic signal, said virtual range being different from an actual range of the device or of the aerial vehicle with respect to said at least one radar or antenna, for calibrating said at least one radar or antenna based on said transmitted electromagnetic signal which simulates a virtual range of the device or of the aerial vehicle with respect to said at least one radar or antenna.

17. The method of claim 15, comprising applying a given delay when at least one of the device and the aerial vehicle is in a proximity zone of the radar or antenna or enters a proximity zone of the radar or antenna, wherein said given delay simulates a virtual range of the device or of the aerial vehicle which is out of said proximity zone.

18. The method of claim 15, wherein a change in a virtual range of the device or of the aerial vehicle in a given period of time is different from a simulated radial velocity of the device or of the aerial vehicle in said given period of time.

* * * * *

UNITED STATES PATENT AND TRADEMARK OFFICE
CERTIFICATE OF CORRECTION

PATENT NO. : 11,131,751 B2  
APPLICATION NO. : 16/233977  
DATED : September 28, 2021  
INVENTOR(S) : Josef Steinmetz Page 1 of 1

It is certified that error appears in the above-identified patent and that said Letters Patent is hereby corrected as shown below:

In the Claims

In Claim 15, Column 23, Line 16, please delete "signals" and add "signal"

In Claim 15, Column 23, Line 18, please delete "signals" and add "signal"

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*